United States Patent
Brabec et al.

(10) Patent No.: US 10,630,709 B2
(45) Date of Patent: Apr. 21, 2020

(54) ASSESSING DETECTABILITY OF MALWARE RELATED TRAFFIC

(71) Applicant: Cisco Technology, Inc., San Jose, CA (US)

(72) Inventors: Jan Brabec, Rakovnik (CZ); Lukas Machlica, Prague (CZ)

(73) Assignee: Cisco Technology, Inc., San Jose, CA (US)

(*) Notice: Subject to any disclaimer, the term of this patent is extended or adjusted under 35 U.S.C. 154(b) by 247 days.

(21) Appl. No.: 15/895,072

(22) Filed: Feb. 13, 2018

(65) Prior Publication Data

US 2019/0253442 A1    Aug. 15, 2019

(51) Int. Cl.
*G06F 21/00* (2013.01)
*H04L 29/06* (2006.01)
*G06N 20/00* (2019.01)

(52) U.S. Cl.
CPC ......... *H04L 63/1425* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,288,220 B2 | 3/2016 | Raugas et al. | |
| 9,749,353 B1 | 8/2017 | Benskin et al. | |
| 10,063,434 B1* | 8/2018 | Khanal | G06N 20/00 |
| 10,133,791 B1* | 11/2018 | Chan | G06F 16/2465 |
| 10,181,009 B2* | 1/2019 | Yeatman | C12Q 1/6886 |
| 10,361,802 B1* | 7/2019 | Hoffberg-Borghesani | H04N 5/782 |
| 2004/0172374 A1 | 9/2004 | Forman | |
| 2016/0026922 A1 | 1/2016 | Vasseur et al. | |
| 2017/0032279 A1 | 2/2017 | Miserendino et al. | |

OTHER PUBLICATIONS

Zinovev, Dmitriy et al. Building an Ensemble of Probabilistic Classifiers for Lung Nodule Interpretation. 2011 10th International Conference on Machine Learning and Applications and Workshops. https://ieeexplore.ieee.org/stamp/stamp.jsp?tp=&arnumber=6147665 (Year: 2011).*

(Continued)

*Primary Examiner* — Jeremiah L Avery
(74) *Attorney, Agent, or Firm* — Behmke Innovation Group LLC; James M. Behmke; Jonathon P. Western

(57) ABSTRACT

In one embodiment, a computing device trains a multi-class classifier (having a plurality of classes) on a training dataset, and evaluates the multi-class classifier on a testing dataset to determine a performance of each of the plurality of classes. The plurality of classes may then be partitioned into either learnable or unlearnable based on whether the performance each particular class surpasses a particular threshold, and then a predicting classifier can be trained on the training dataset, where data of the training dataset is labelled as either learnable or unlearnable based on the particular class to which the data corresponds. Accordingly, the computing device may then use the predicting classifier on a new class to predict whether samples associated with the new class are learnable or unlearnable, and may retrain the multi-class classifier with the samples associated with the new class in response to predicting that the samples are learnable.

20 Claims, 5 Drawing Sheets

(56) References Cited

OTHER PUBLICATIONS

Shahi, Ahmad et al. A Streaming Ensemble Classifier with Multi-Class Imbalance Learning for Activity Recognition. 2017 International Joint Conference on Neural Networks (IJCNN). https://ieeexplore.ieee.org/stamp/stamp.jsp?tp=&arnumber=7966358 (Year: 2017).*

Zhou, Zhi-Hua; Liu, Xu-Ying. Training Cost-Sensitive Neural Networks with Methods Addressing the Class Imbalance Problem. IEEE Transactions on Knowledge and Data Engineering, vol. 18, Issue: 1. https://ieeexplore.ieee.org/stamp/stamp.jsp?tp=& arnumber=1549828 (Year: 2006).*

Cronen-Townsend, et al., "Predicting Query Performance", SIGIR'02, 8 pages, 2002, ACM.

Zhou, et al., "Query Performance Prediction in Web Search Environments", Content Detection and Distributed Information retrieval, in Proceedings of SIGIR 2005, 9 pages, 2005, ACM.

* cited by examiner

ASSESSING DETECTABILITY OF MALWARE RELATED TRAFFIC

TECHNICAL FIELD

The present disclosure relates generally to computer networks, and, more particularly, to assessing detectability of malware related traffic.

BACKGROUND

Commonly, machine learning solutions for network traffic classification distinguish only two different classes: malicious and benign. For known types of malware serving different purposes with different risk levels, this is not sufficient. Therefore, multi-class classifiers trained on millions up to billions of samples are built, being significantly more robust to malware variations than traditional signatures. Multi-class labels can relate to different malware campaigns or families with well-known risk levels. Whenever a novel malware family is found or not covered by an existing classifier, the classifier is retrained.

Unfortunately, the cost of the retraining and deployment of the updated model can become expensive. For example, in threat research it is not possible to label all the traffic. Before a classifier is deployed, its detections have to be analyzed and the unknown detections have to be manually labeled in order to estimate true performance of the updated classifier. However, if the performance threshold put on precision, for example, does not hold, the classifier cannot be deployed.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a computing device trains a multi-class classifier on a training dataset, the multi-class classifier having a plurality of classes, and evaluates the multi-class classifier on a testing dataset to determine a performance of each class of the plurality of classes of the multi-class classifier. The plurality of classes may then be partitioned into either learnable or unlearnable based on whether the performance each particular class surpasses a particular threshold, and then a predicting classifier can be trained on the training dataset, where data of the training dataset is labelled as either learnable or unlearnable based on the particular class to which the data corresponds. Accordingly, the computing device may then use the predicting classifier on a new class to predict whether samples associated with the new class are learnable or unlearnable, and may retrain the multi-class classifier with the samples associated with the new class in response to predicting that the samples are learnable.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
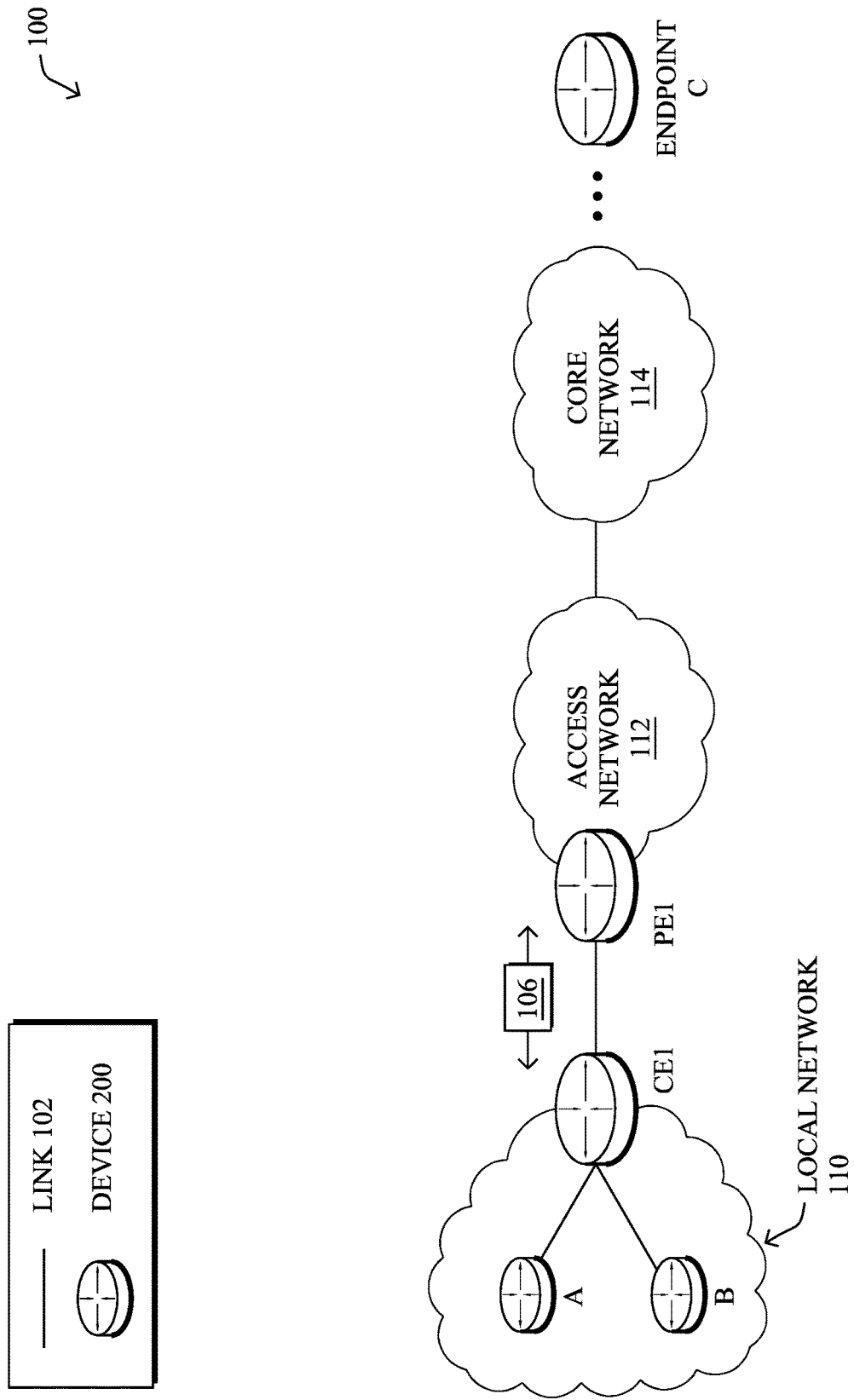
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the hypertext transfer protocol (HTTP) secure (HTTPS) protocol, to encrypt and decrypt data packets 106.

Figure 2:
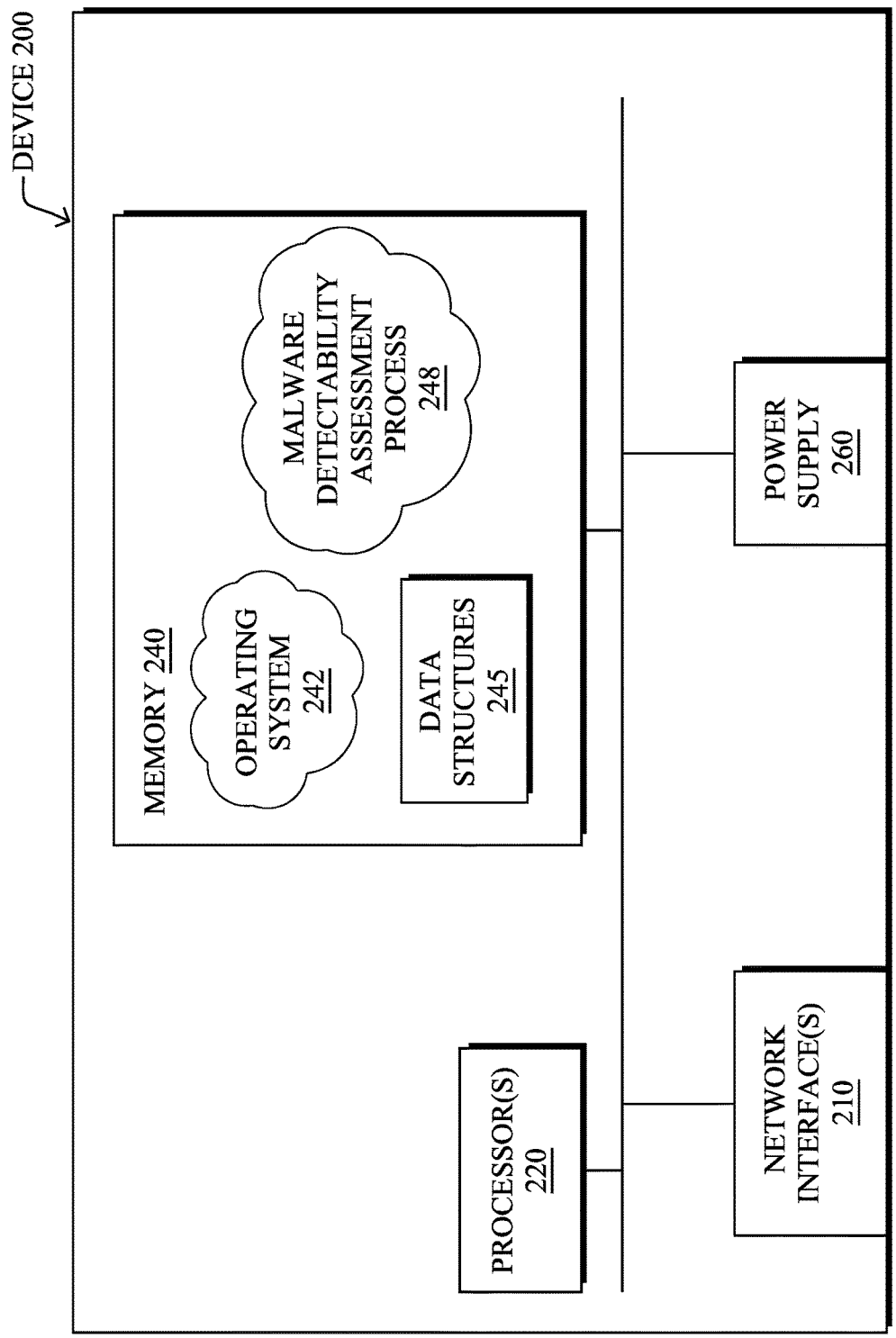
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise a malware detectability assessment process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

The device 200 may be part of a self-learning network (SLN), configured to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1) a lack of a ground truth (e.g., examples of normal vs. abnormal network behavior), 2) being able to define a "normal" region in a highly dimensional space can be challenging, 3) the dynamic nature of the problem due to changing network behaviors/anomalies, 4) malicious behaviors such as malware, viruses, rootkits, etc. may adapt in order to appear "normal," and 5) differentiating between noise and relevant anomalies is not necessarily possible from a statistical standpoint, but typically also requires domain knowledge.

Anomalies may also take a number of forms in a computer network: 1) point anomalies (e.g., a specific data point is abnormal compared to other data points), 2) contextual anomalies (e.g., a data point is abnormal in a specific context but not when taken individually), or 3) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1) a user using a discovery tool that performs (massive) undesirable scanning in the network (in contrast with a lawful scanning by a network management tool performing device discovery), 2) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. Identify these forms of misconfigurations allow them to be detected and fixed.

In various embodiments, machine learning techniques may be utilized to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, graph-based models may be used for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

Assume, for purposes of illustration, that a security device (e.g., a customer edge router, firewall, etc.) monitors traffic flows associated with the devices of a local network (e.g., by comparing the monitored conditions to one or more machine-learning models). For example, assume that device/node (e.g., node A) sends a particular traffic flow to a server (e.g., an application server, etc.). In such a case, the security device may monitor the packets of the traffic flow and, based on its local anomaly detection mechanism, determine that the traffic flow is anomalous. Anomalous traffic flows may be incoming, outgoing, or internal to a local network serviced by a DLA, in various cases.

In some cases, the traffic may be associated with a particular application supported by network 100. Such applications may include, but are not limited to, automation applications, control applications, voice applications, video applications, alert/notification applications (e.g., monitoring applications), communication applications, and the like. For example, traffic may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. The ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

———Assessing Detectability of Malware Related Traffic———

As noted above, many machine learning solutions for network traffic classification currently distinguish only between malicious and benign traffic. However, because different types of malware exist with correspondingly different risk levels (and impact on a classifier), multi-class classifiers are being built that are significantly more robust to malware variations than traditional signatures (and that can relate to different malware campaigns or families with well-known risk levels).

As also noted above, however, training multi-class classifiers requires training on a significantly large number of samples (e.g., millions to billions of samples), and whenever a malware family is newly discovered (or not covered by an existing classifier), the multi-class classifier must be retrained. The retraining and deployment of the updated model comes at a substantial cost, since before a classifier is deployed, its detections have to be analyzed and unknown detections have to be manually labeled in order to estimate true performance of the updated classifier. Unseen datasets must be run through the system to determine the performance of the updated classifier, and then if the performance is unsatisfactory, the classifier must be excluded and the multi-class classifier must be retrained. This process is typically lengthy, difficult, inaccurate, and highly subjective.

The techniques herein, on the other hand, propose to address the question as to whether the retraining of a classifier will increase its performance. More than that, the techniques herein address whether, without any retraining, can the detectability be assessed (i.e., learning criteria of detectability) of a classifier in order to delimit its usability.

More precisely, given a set of samples (e.g., related to network proxy logs or Encrypted Traffic Analysis (ETA)) that should represent one class in the multi-class classifier (e.g., from one malware family), and given a set of numerical features (e.g., a list of cipher suite type codes, transferred bytes, URL length, ports, etc.) that are used to describe the samples, the techniques herein are able to predict the detectability of this class. For example, if a detection system operates on URLs, information contained in short URLs (e.g., a URL given only a domain) will be much lower than in long URLs with different query parameters. It will be readily apparent to those skilled in the art that malicious communication with URLs containing only domain names will not be learnable by a URL based classifier (omitting a trivial domain blacklist-based classifier). The techniques herein, therefore, propose how such a predictor can be automatically learned from available data.

Said differently, the techniques herein propose a training procedure of a machine learning model that, instead of classifying input telemetry into malware classes, predicts if a vector or a whole class can be learned or not. This is achieved as described below by training a model on data with labels that are determined from evaluation of a regular model that was previously trained using standard methods.

Specifically, according to one or more embodiments of the disclosure as described in detail below, a computing device trains a multi-class classifier on a training dataset, the multi-class classifier having a plurality of classes, and evaluates the multi-class classifier on a testing dataset to determine a performance of each class of the plurality of classes of the multi-class classifier. The plurality of classes may then be partitioned into either learnable or unlearnable based on whether the performance each particular class surpasses a particular threshold, and then a predicting classifier can be trained on the training dataset, where data of the training dataset is labelled as either learnable or unlearnable based on the particular class to which the data corresponds. Accordingly, the computing device may then use the predicting classifier on a new class to predict whether samples associated with the new class are learnable or unlearnable, and may retrain the multi-class classifier with the samples associated with the new class in response to predicting that the samples are learnable.

Illustratively, the techniques described herein may be performed by hardware, software, and/or firmware, such as in accordance with the malware detectability assessment process 248, which may include computer executable instructions executed by the processor 220 to perform functions relating to the techniques described herein, e.g., in conjunction with one or more other processes or devices, accordingly.

Operationally, the techniques herein propose a training procedure of a machine learning model that instead of classifying input telemetry into malware classes, predicts if the class can be learned or not. In particular, the techniques herein assume that a first prototype of a multi-class classifier ("M") was trained, e.g., using all the different malware classes as class labels. A predicting classifier "P" has to use the same dataset and features as the classifier M. However, it does not use malware classes as labels, but samples are labeled based on the performance of classifier M. As described below, malware classes are divided into "learnable" and "unlearnable" based on their performance metrics (e.g., precision, recall) and labels are assigned to samples in the classes based on their membership in the learnable or unlearnable set. (Alternatively, the value of precision or recall can be used directly as a label to train a regression model.)

Figure 3A:
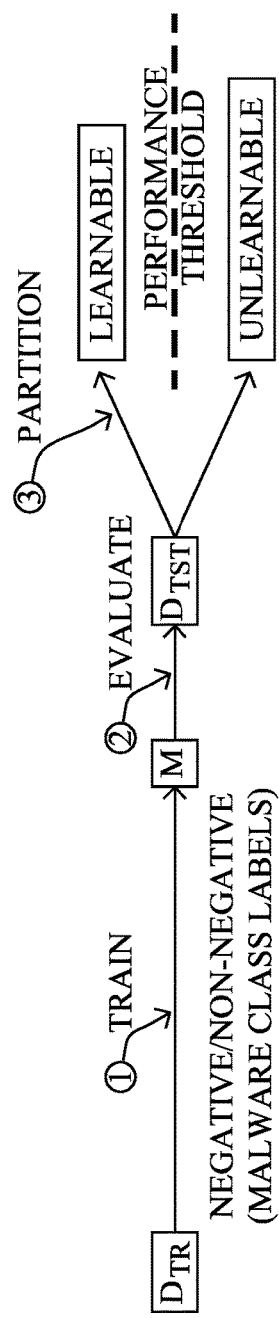
FIGS. 3A-3B illustrate an example of assessing detectability of malware related traffic.
Figure 3B:
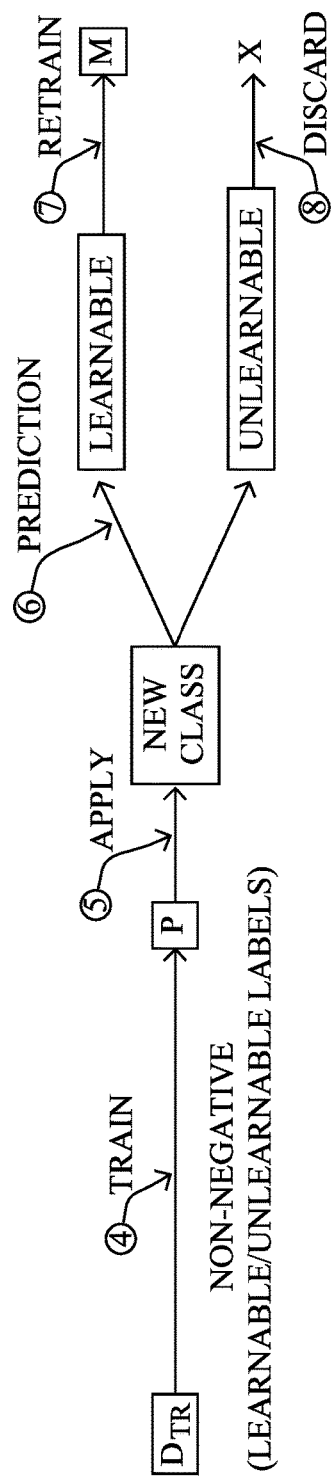

Reference is made to the system 300 of FIGS. 3A-3B (300a and 300b, respectively) to summarize the proposed algorithm:

1. Multi-class model M is trained on a training dataset "$D_{TR}$", where data may be illustratively labeled based on the malware class they are associated with. Data that are not associated with any malware class are labeled as negative. $D_{TR}$ consists of the negative (benign) set and the labeled malware samples (non-negative or positive).
2. Model M is evaluated on an unseen testing dataset "$D_{TST}$" and performance metrics for each class (e.g., precision) are computed.
3. The malware classes may then be partitioned into learnable and unlearnable sets based on a performance threshold (e.g., set on precision) of individual classes. Samples of a class with precision higher than the threshold are labeled as learnable, the rest are labeled as unlearnable.
4. Model P is trained on non-negative data from dataset $D_{TR}$, where data are labeled either learnable or unlearnable based on the malware class they are associated with. Since no benign set is needed, the model can be trained on samples from positive classes only. The training is thus much faster than in the case of model M, which operates on the full dataset.
    Note that P can be a binary classifier (learnable/unlearnable) or a regression model predicting possible performance (e.g., precision) of a given class. In this case the labels of each sample are given by the performance of their respective class.
5. When a new malware class is available for training, model P is applied, and
6. Used to predict if the samples associated with the class are learnable or not.
7. If yes (learnable), model M is retrained/updated with the samples from the new class.
8. If no (unlearnable), then the new class may be simply discarded. In this case, the model M need not be changed, since the behavior is based on information that cannot be learned. As such, one option is to enlarge the feature set, to retrain the multi-class classifier, and hence train a new predictor, and so on.

According to one or more embodiments herein, principles from multiple instance learning may be used. In this case instead of classifying single samples, all of the samples of one class are classified at once. One approach is to use a pooling function which aggregates multiple feature vectors and produces a single feature vector. It is not required for this new feature vector to be of the same length as the original feature vector. The most straightforward pooling functions are mean and median which produce a single feature vector from multiple ones by computing a mean or median along every feature. If necessary, more sophisticated pooling functions can be designed. Another method can be to compute the ratio of detectable and undetectable samples in a class and use for example major voting scheme.

Notably, although any classifier algorithm can be used to train the model P, random forests have the advantage that they perform intrinsic feature selection. Feature importance computed on the trained random forest model is well suited to identify features and their degree of importance for a sample to be learnable/detectable. That is, the techniques herein can explain what the classifier is able to learn and detect given the provided features, and thereby assess the usability of a given feature set.

Note further that the prediction model can also be easily used as a data pre-filtering tool for models with expensive evaluation, because it can easily recognize and filter out undetectable input. Said differently, to deploy a model, expensive computations are required to classify a lot of data and to capture useful features. The techniques herein, however, allow for declaring particular features as unlearnable, and thus those do not need to be classified (i.e., filtering out anything unclassified). For a simple example, if the system detects the length of a URL, and then the data has no real length (i.e., is short), then the data doesn't need to be classified, and can just be dropped.

Figure 4:
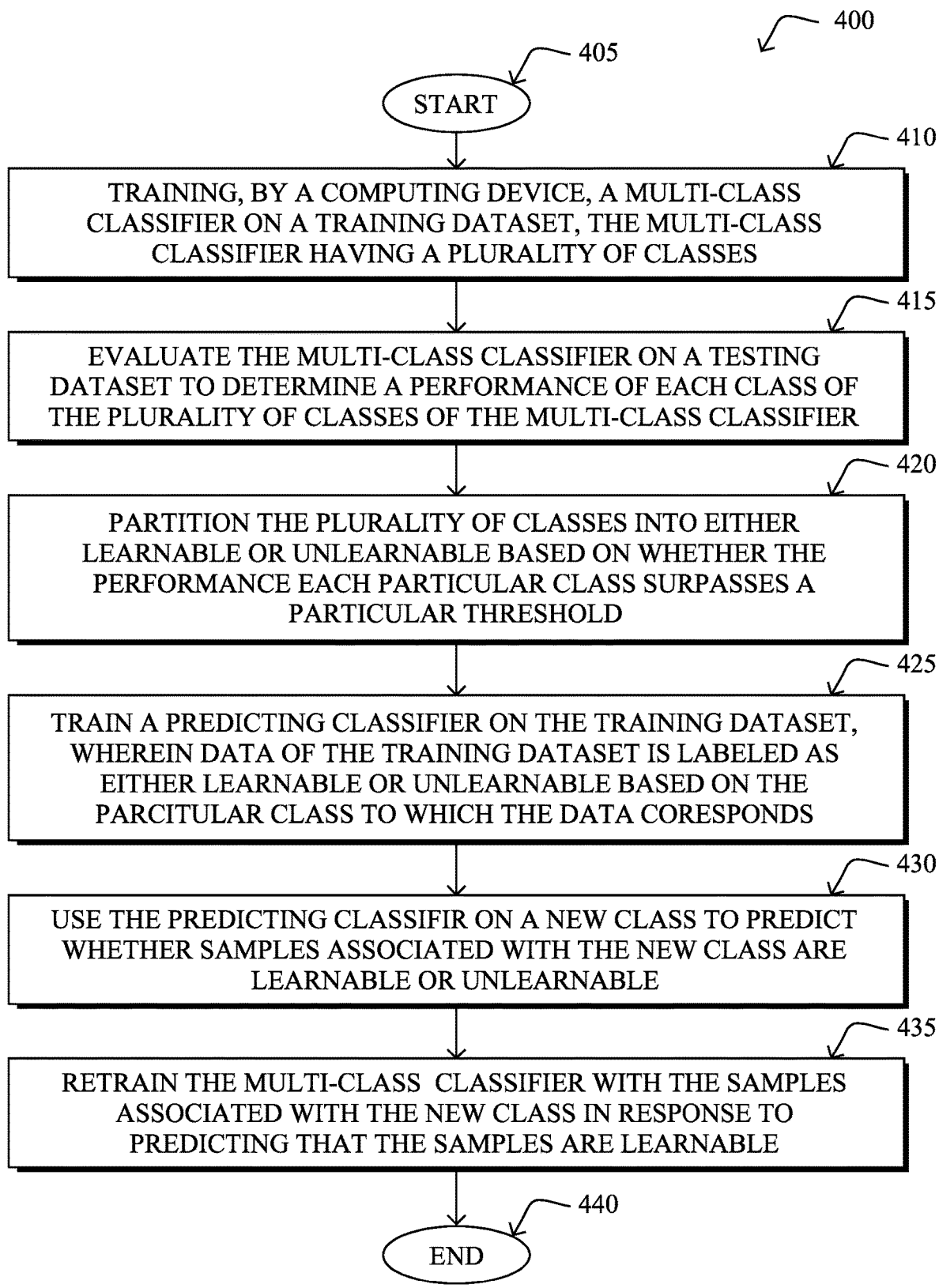
FIG. 4 illustrates an example simplified procedure for assessing detectability of malware related traffic.

FIG. 4 illustrates an example simplified procedure for assessing detectability of malware related traffic in accordance with one or more embodiments described herein. For example, a non-generic, specifically configured device (e.g., computing device 200) may perform procedure 400 by executing stored instructions (e.g., process 248). The procedure 400 may start at step 405, and continues to step 410, where, as described in greater detail above, a multi-class classifier M (e.g., from one malware family) is trained on a training dataset $D_{TR}$, the multi-class classifier having a plurality of classes (e.g., malware classes). As mentioned above, the training dataset may comprise benign negative data and malicious non-negative (positive) data, and may be related to network flow data, proxy log data, ETA data, and so on. (Note also that classes consist of numerical features such as a list of cipher suite type codes, transferred bytes, URL length, port number, and so on.)

In step 415, the computing device evaluates the multi-class classifier on a testing dataset $D_{TST}$ to determine a performance of each class of the plurality of classes of the multi-class classifier, such that in step 420, the plurality of classes may be partitioned into either learnable or unlearnable based on whether the performance each particular class surpasses a particular threshold. Note that as described above, the particular threshold may be set separately for each individual class of the plurality of classes, or else may be shared across all classes.

In step 425, a predicting classifier P may be trained on the training dataset $D_{TR}$, where data of the training dataset is now labelled as either learnable or unlearnable based on the particular class to which the data corresponds. As described above, the predicting classifier (e.g., a random forest classifier in one embodiment) may be trained on only non-negative data from the training dataset, since benign data is unnecessary. Note further that as also described above the predicting classifier may be a regression model predicting a level of performance of a given class, such that the training dataset may instead be labelled according to corresponding levels of how learnable is each particular class (instead of simply a binary "learnable/unlearnable" label). Note still further that multiple instance learning may be used as described above to classify all samples of each given class at once.

In step 430, the computing device may then use the predicting classifier P on a new class (e.g., based on a set of samples representing the new class having a set of numerical features used to describe the samples) to predict whether samples associated with the new class are learnable or unlearnable. In response to predicting that the samples are learnable, then in step 435 the multi-class classifier can then be retrained with the samples associated with the new class.

The simplified example procedure 400 may then end in step 440, notably with the option to continue to predict/assess learnability of new classes, and retraining the multi-class classifier, accordingly. Note further that the procedure may include using the multi-class classifier, such as sharing the classifier with other devices to detect malware or other malicious behavior, or else performing incident detection at the computing device directly itself.

It should be noted that while certain steps within procedure 400 may be optional as described above, the steps shown in FIG. 4 (as well as FIGS. 3A-3B) are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for assessing detectability of malware related traffic. In particular, detectability/learnability of a novel class can be assessed prior to the retraining process of a classifier, such that undetectable samples, which do not have to be introduced to the multi-class classifier, can be filtered out (which is especially useful when the multi-classification model is expensive to be evaluated). A feedback loop provided in this manner as an analytics tool allows for the timeline of training a multi-class classifier to be reduced from weeks to near instantaneous performance, thus allowing for the techniques herein to be executed during in real-time. Furthermore, if a random forest is used in place of the classifier P, features responsible for detectability of classes to be learned can be easily obtained and prioritized.

Notably, prediction models have been previously proposed in order measure the degree of ambiguity of a query with respect to a collection of documents. Though the question addressed in these previous proposals is how well a model can give answers to stated questions, they are primarily interested in comparison of statistical models of word distributions. The techniques herein, on the other hand, propose a data-driven approach to train a prediction model based on observed data and all available features.

While there have been shown and described illustrative embodiments that provide for assessing detectability of malware related traffic, it is to be understood that various other adaptations and modifications may be made within the spirit and scope of the embodiments herein. For example, while certain embodiments are described herein with respect to using certain models, features, labels, data, etc., for purposes of describing and/or detecting malware, the techniques herein are not limited as such and may be used with other particulars, in other embodiments. In addition, while certain protocols are shown, such as IP, HTTP, TLS, etc., other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   training, by a computing device, a multi-class classifier on a training dataset, the multi-class classifier having a plurality of classes;
   evaluating, by the computing device, the multi-class classifier on a testing dataset to determine a performance of each class of the plurality of classes of the multi-class classifier;
   partitioning, by the computing device, the plurality of classes into either learnable or unlearnable based on whether the performance each particular class surpasses a particular threshold;
   training, by the computing device, a predicting classifier on the training dataset, wherein data of the training dataset is labelled as either learnable or unlearnable based on the particular class to which the data corresponds;
   using, by the computing device, the predicting classifier on a new class to predict whether samples associated with the new class are learnable or unlearnable; and
   retraining, by the computing device, the multi-class classifier with the samples associated with the new class in response to predicting that the samples are learnable.

2. The method as in claim 1, wherein the predicting classifier is trained on only non-negative data from the training dataset.

3. The method as in claim 1, wherein the training dataset comprises benign negative data and malicious non-negative data.

4. The method as in claim 1, wherein the training dataset and testing dataset comprise samples related to one or more of network flow data, proxy log data, and encrypted traffic analysis (ETA) data.

5. The method as in claim 1, wherein the predicting classifier is a regression model predicting a level of performance of a given class, and wherein the training dataset is labelled according to corresponding levels of how learnable is each particular class.

6. The method as in claim 1, wherein the particular threshold is set separately for each individual class of the plurality of classes.

7. The method as in claim 1, further comprising:
   using multiple instance learning to classify all samples of each given class at once.

8. The method as in claim 1, wherein the new class is based on a set of samples representing the new class, wherein the set of samples has a set of numerical features used to describe the samples.

9. The method as in claim 1, wherein the predicting classifier is based on a random forest classifier.

10. The method as in claim 1, wherein the multi-class classifier is from one malware family.

11. The method as in claim 1, wherein the plurality of classes consist of numerical features selected from a group consisting of: a list of cipher suite type codes; transferred bytes; uniform resource locator (URL) length; and port number.

12. The method as in claim 1, wherein the plurality of classes are malware classes.

13. A tangible, non-transitory, computer-readable medium storing program instructions that cause a computer to execute a process comprising:
   training a multi-class classifier on a training dataset, the multi-class classifier having a plurality of classes;
   evaluating the multi-class classifier on a testing dataset to determine a performance of each class of the plurality of classes of the multi-class classifier;

partitioning the plurality of classes into either learnable or unlearnable based on whether the performance each particular class surpasses a particular threshold;

training a predicting classifier on the training dataset, wherein data of the training dataset is labelled as either learnable or unlearnable based on the particular class to which the data corresponds;

using the predicting classifier on a new class to predict whether samples associated with the new class are learnable or unlearnable; and retraining the multi-class classifier with the samples associated with the new class in response to predicting that the samples are learnable.

14. The computer-readable medium as in claim 13, wherein the predicting classifier is trained on only non-negative data from the training dataset.

15. The computer-readable medium as in claim 13, wherein the predicting classifier is a regression model predicting a level of performance of a given class, and wherein the training dataset is labelled according to corresponding levels of how learnable is each particular class.

16. The computer-readable medium as in claim 13, wherein the particular threshold is set separately for each individual class of the plurality of classes.

17. An apparatus, comprising:
one or more network interfaces to communicate with a computer network;
a processor coupled to the network interfaces and configured to execute one or more process; and
a memory configured to store a process executable by the processor, the process when executed configured to:

train a multi-class classifier on a training dataset, the multi-class classifier having a plurality of classes;

evaluate the multi-class classifier on a testing dataset to determine a performance of each class of the plurality of classes of the multi-class classifier;

partition the plurality of classes into either learnable or unlearnable based on whether the performance each particular class surpasses a particular threshold;

train a predicting classifier on the training dataset, wherein data of the training dataset is labelled as either learnable or unlearnable based on the particular class to which the data corresponds;

use the predicting classifier on a new class to predict whether samples associated with the new class are learnable or unlearnable; and retrain the multi-class classifier with the samples associated with the new class in response to predicting that the samples are learnable.

18. The apparatus as in claim 17, wherein the predicting classifier is trained on only non-negative data from the training dataset.

19. The apparatus as in claim 17, wherein the predicting classifier is a regression model predicting a level of performance of a given class, and wherein the training dataset is labelled according to corresponding levels of how learnable is each particular class.

20. The apparatus as in claim 17, wherein the particular threshold is set separately for each individual class of the plurality of classes.

* * * * *